United States Patent
Tsai et al.

(10) Patent No.: US 8,419,260 B2
(45) Date of Patent: Apr. 16, 2013

(54) DISPLAY DEVICE

(75) Inventors: Ruei-Hung Tsai, Kaohsiung (TW); Chi-Feng Chiu, Taipei (TW); Shih-Yao Lin, Nantou County (TW)

(73) Assignee: Au Optronics Corporation, Hsinchu (TW)

( * ) Notice: Subject to any disclaimer, the term of this patent is extended or adjusted under 35 U.S.C. 154(b) by 211 days.

(21) Appl. No.: 13/023,496

(22) Filed: Feb. 8, 2011

(65) Prior Publication Data

US 2012/0147622 A1    Jun. 14, 2012

(30) Foreign Application Priority Data

Dec. 8, 2010   (TW) .............................. 99142831 A

(51) Int. Cl.
*F21V 7/04* (2006.01)
(52) U.S. Cl.
USPC ............ 362/618; 362/617; 362/627; 362/632
(58) Field of Classification Search ................... 362/615, 362/617–619, 627, 632; 349/58, 60, 64, 349/65
See application file for complete search history.

(56) References Cited

U.S. PATENT DOCUMENTS

| | | | | |
|---|---|---|---|---|
| 6,175,396 B1 * | 1/2001 | Kim et al. | ....................... | 349/58 |
| 6,773,127 B2 * | 8/2004 | Kao | .............................. | 362/627 |
| 2002/0024623 A1 * | 2/2002 | Kim et al. | ....................... | 349/58 |
| 2007/0230218 A1 * | 10/2007 | Jachim et al. | ................. | 362/627 |

FOREIGN PATENT DOCUMENTS

| KR | 20080001008 | 1/2008 |
|---|---|---|
| TW | I240121 | 9/2005 |
| TW | M331678 | 5/2008 |

OTHER PUBLICATIONS

"First Office Action of China Counterpart Application", issued on Aug. 19, 2011, p. 1-p. 4, in which the listed reference was cited.

* cited by examiner

*Primary Examiner* — Thomas Sember
(74) *Attorney, Agent, or Firm* — Jianq Chyun IP Office

(57) ABSTRACT

A display includes a display panel and a backlight module. The backlight module is configured below the display panel and includes a light guide plate (LGP), a light source, an optical film, and a pad. The light source is located near the LGP. The optical film is configured on the LGP. The pad is located between the optical film and the display panel. A first surface of the pad is fixed to the optical film, and a second surface of the pad is slidable relative to the display panel.

10 Claims, 2 Drawing Sheets

DISPLAY DEVICE

CROSS-REFERENCE TO RELATED APPLICATION

This application claims the priority benefit of Taiwan application serial no. 99142831, filed on Dec. 8, 2010. The entirety of the above-mentioned patent application is hereby incorporated by reference herein and made a part of this specification.

BACKGROUND OF THE INVENTION

1. Field of the Invention

The invention relates to a display, and more particularly, to a display having favorable display quality.

2. Description of Related Art

With great advance in photoelectric technology and manufacturing techniques of semiconductor devices, flat panel displays have been vigorously developed. Among the flat panel displays, liquid crystal displays (LCDs) characterized by low operating voltage, free of harmful radiation, light weight, and small and compact size have been gradually replacing conventional cathode ray tube (CRT) displays and have become mainstream display products.

In general, an LCD includes a backlight module, an LCD panel, and so on. The LCD panel is configured on a backlight module. The backlight module includes a light source, a light guide plate (LGP), an optical film, and other components, and the backlight module outputs a backlight source for displaying images on the LCD panel. To be more specific, in an exemplary edge type backlight module, the light source is configured at a side of the LGP for providing the LGP with a light beam, for instance. The light is continuously refracted by the LGP, passes the optical film, and then enters the LCD panel. The optical film is configured between the LCD panel and the LGP, for instance. Besides, the optical film includes a lower diffuser, a lower prism, an upper prism, and an upper diffuser that are sequentially stacked on the LGP, for instance.

In the backlight module, the optical film often has a multi-film structure. Therefore, when the optical film absorbs heat generated by the light source, thermal expansion of each film in the optical film may be different, and the difference is likely to cause distortion of the optical film. Moreover, the optical film may also be warped after an improper manufacturing process or an improper cutting process is performed on the optical film. When the optical film is warped or distorted, a stray light coming from the light source may directly enter the optical film (e.g., the prism) and then further enter the LCD panel. Thereafter, the light may be escaped from the LCD panel, thus deteriorating the display quality of the LCD panel.

SUMMARY OF THE INVENTION

The invention is directed to a display which has favorable display quality.

The invention provides a display. The display includes a display panel and a backlight module. The backlight module is configured below the display panel and includes an LGP, a light source, an optical film, and a pad. The light source is located near the LGP. The optical film is configured on the LGP. The pad is located between the optical film and the display panel. A first surface of the pad is fixed to the optical film, and a second surface of the pad is slidable relative to the display panel.

According to an embodiment of the invention, the second surface of the pad is in contact with the display panel, or a gap exists between the second surface of the pad and the display panel.

According to an embodiment of the invention, the gap is substantially smaller than about 0.15 mm.

According to an embodiment of the invention, the pad is configured on an edge of the optical film.

According to an embodiment of the invention, the edge of the optical film corresponds to a non-display region of the display panel.

According to an embodiment of the invention, the optical film includes a flexible base film.

According to an embodiment of the invention, the optical film includes a prism, a diffuser, a polarizer, an enhancement film, or a multi-functional optical film.

According to an embodiment of the invention, the pad includes a single-sided adhesive tape.

According to an embodiment of the invention, a material of the pad includes an organic material.

According to an embodiment of the invention, a method of forming the pad includes printing or coating.

Based on the above, the pad that can avoid the distortion of the optical film is configured between the display panel and the optical film in the display according to the embodiments of the invention. As such, the stray light coming from the light source can be prohibited from directly entering the optical film and then escaping, and thus the display can have favorable display quality.

In order to make the aforementioned and other features and advantages of the invention more comprehensible, embodiments accompanying figures are described in detail below.

BRIEF DESCRIPTION OF THE DRAWINGS

The accompanying drawings constituting a part of this specification are incorporated herein to provide a further understanding of the invention. Here, the drawings illustrate embodiments of the invention and, together with the description, serve to explain the principles of the invention.

DESCRIPTION OF EMBODIMENTS

Figure 1:
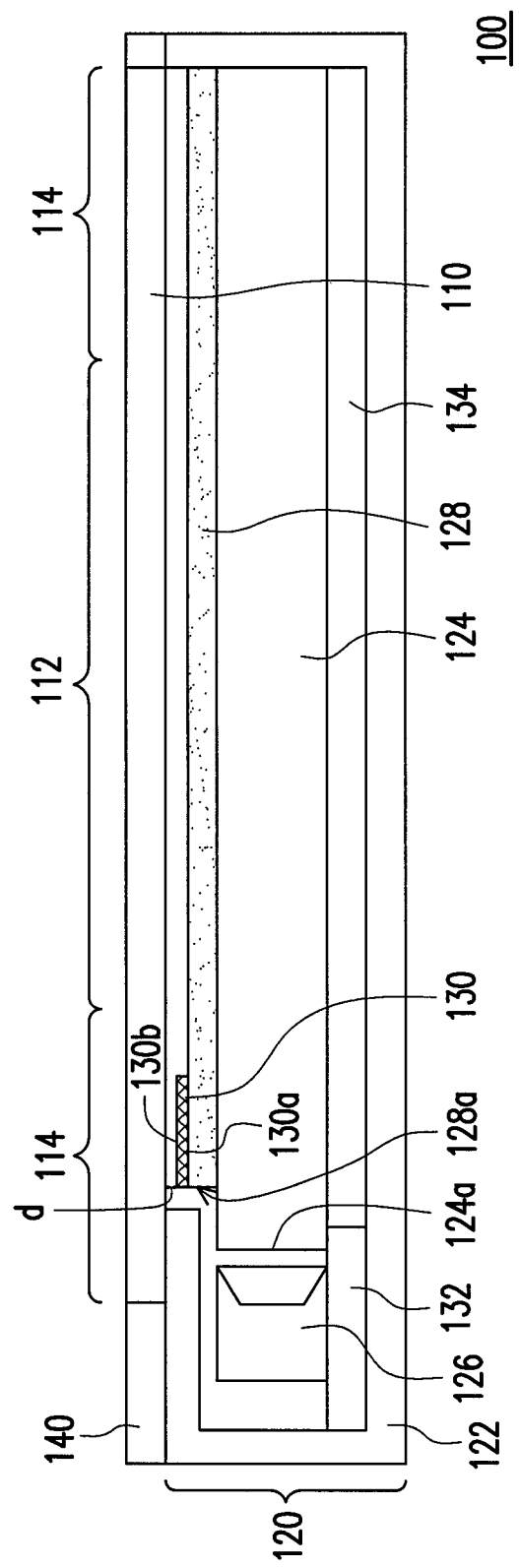
FIG. 1 is a schematic cross-sectional view illustrating an LCD according to an embodiment of the invention.

FIG. 1 is a schematic cross-sectional view illustrating an LCD according to an embodiment of the invention. With reference to FIG. 1, the display 100 includes a display panel 110 and a backlight module 120. The backlight module 120 is configured below the display panel 110. Namely, the display panel 110 is configured on the light emitting surface of the backlight module 120, so as to receive the light coming from the backlight module 120 and thereby perform the display function. In this embodiment, the display 100 further includes a front bezel 140, and the display panel 110 is assembled to the front bezel 140 and the back plate 122 of the backlight module 120, so as to form the display 100. The display panel 110 of this embodiment is, for example, a transmissive LCD panel, a transflective LCD panel, or any other display panel suitable for applying the backlight source, which should not be construed as a limitation to the invention. The display panel 110 has a display region 112 and a non-display region 114 that surrounds the display region 112, for instance. It should be mentioned that the display panel 110 and the backlight module 120 in this embodiment are assembled by the front bezel 140 and the back plate 122 that are shown in FIG. 1, while the invention is not limited thereto. The display 100 can be formed by assembling the display panel 110 and the backlight module 120 in other manner known to people having ordinary skill in the pertinent art.

The backlight module 120 includes a back plate 122, an LGP 124, a light source 126, an optical film 128, and a pad 130. The light source 126 is located near the LGP 124. In this embodiment, the LGP 124 is configured on the back plate 122, for instance, and the light source 126 is located on at least one side 124a of the LGP 124 and located on the back plate 122, for instance. Here, the light source 126 is a light emitting diode (LED) or a cold cathode fluorescent lamp (CCFL), for instance. According to another embodiment of the invention, the light source 126 can also be located below the LGP 124. The backlight module 120 of this embodiment further includes a flexible circuit board 132 and a reflective film 134, for instance. The flexible circuit board 132 is configured between the back plate 122 and the light source 126, for instance, and the light source 126 and the flexible circuit board 132 are electrically connected to each other. The reflective film 134 is configured between the back plate 122 and the LGP 124 and is suitable for reflecting the light emitted from the light source 126 to the LGP 124, so as to improve the light emitting efficiency of the backlight module 120.

The optical film 128 is configured on the LGP 124 to uniformize, polarize, or enhance the light emitted from the LGP 124. Namely, the optical film 128 is at least one of prism, diffuser, polarizer, enhancement film, and multi-functional optical film. In this embodiment, the optical film 128, for example, includes a lower diffuser, a lower prism, an upper prism, and an upper diffuser that are sequentially stacked on the LGP 124. Note that the optical film 128 is a flexible base film in this embodiment, for instance, and therefore the optical film 128 may be distorted after absorbing heat. In particular, an edge 128a of the optical film 128 close to the light source 126 may be warped.

The pad 130 is located between the optical film 128 and the display panel 110. A first surface 130a of the pad 130 is fixed to the optical film 128, and a second surface 130b of the pad 130 is slidable relative to the display panel 110. In this embodiment, the pad 130 is configured on the edge of the optical film 128, for instance, and the edge of the optical film 128 corresponds to the non-display region 114 of the display panel 110, for instance. There is a gap d between the second surface 130b of the pad 130 and the display panel 110, for instance. Alternatively, the second surface 130b of the pad 130 is in contact with the display panel 110, which is not shown in the drawings. The gap d is substantially smaller than about 0.15 mm, for instance. Although the second surface 130b of the pad 130 itself is in contact with the display panel 110, or the second surface 130b of the pad 130 is in contact with the display panel 110 after the optical film 128 absorbs heat and is then expanded, the second surface 130b of the pad 130 is still slidable relative to the display panel 110 without being adhered or fixed to the surface of the display panel 110.

Figure 2:
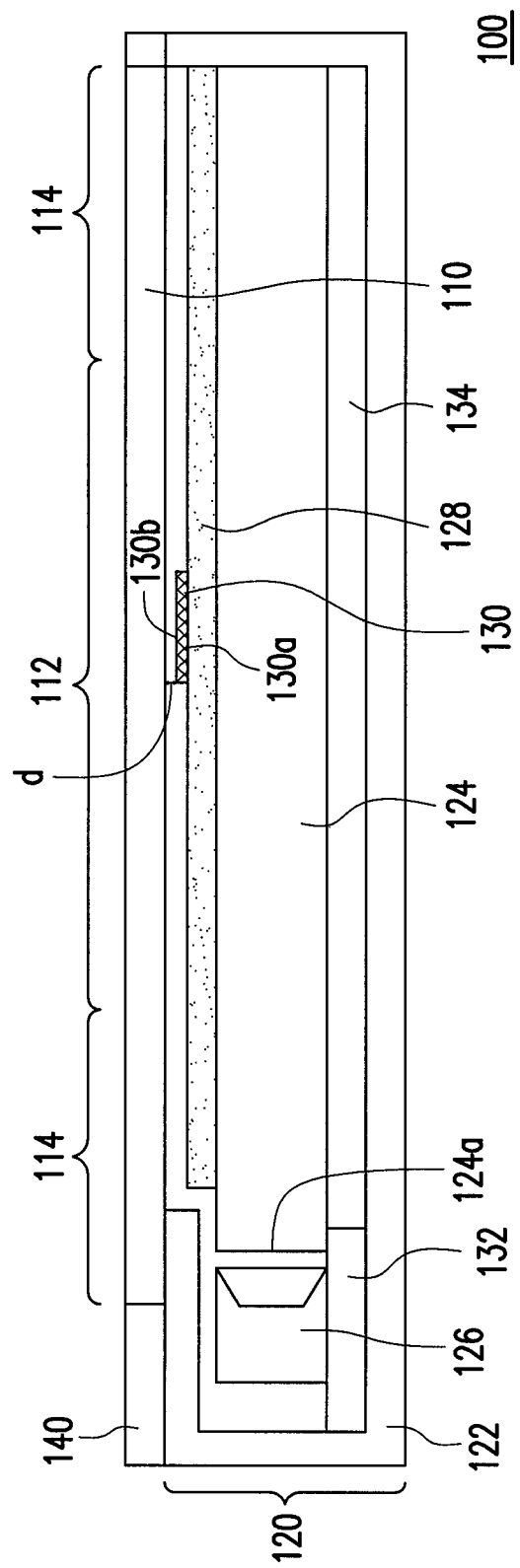
FIG. 2 is a schematic cross-sectional view illustrating an LCD according to another embodiment of the invention.

In this embodiment, the pad 130 is a single-sided adhesive tape, for instance, and therefore the pad 130 is adhered to the optical film 128 by the first surface 130a of the pad 130, for instance. The pad 130 in another embodiment of the invention can be made of an organic material and can be formed by printing or coating. Particularly, the pad 130 is configured on the edge of the optical film 128 in this embodiment, and the edge of the optical film 128 corresponds to the non-display region 114 of the display panel 110. However, as shown in FIG. 2, given that the pad 130 of the display 100 is made of a transparent material in another embodiment of the invention, the pad 130 can be configured on one location on the optical film 128 without reducing the light emitting efficiency of the backlight module 120, and said location corresponds to the display region 112 of the display panel 110.

In a conventional display, the optical film may be distorted after absorbing heat. In particular, the edge of the optical film close to the light source may be warped, or the optical film is distorted after an improper manufacturing process or an improper cutting process is performed on the optical film. Thereby, a stray light coming from the light source may directly enter the optical film (e.g., the prism) and be concentrated, and then the light may escape, which leads to deterioration of the optical quality of the LCD panel. However, in this embodiment, the pad 130 configured on the optical film 128 can prevent the optical film 128 from being warped or distorted due to heat or other factors. As such, the stray light coming from the light source 126 can be prohibited from directly entering the optical film 128 (e.g., the prism) and then escaping, and the display 100 can have favorable display quality. Moreover, the pad 130 is slidable relative to the display panel 110 in a flexible manner, which is conducive to releasing the stress. Thereby, the stress generated by thermal expansion of the pad 130 is not accumulated between the pad 130 and the display panel 110.

In light of the foregoing, the pad that can avoid warp or distortion of the optical film is configured between the display panel and the optical film in the display of the invention. Hence, warp or distortion of the optical film due to heat or other factors can be prevented, and the stray light coming from the light source can be prohibited from directly entering the optical film and then escaping. As such, the display of the invention has favorable display quality.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A display comprising:
    a display panel; and
    a backlight module configured below the display panel and comprising:
        a back plate forming an accommodating space;
        a light guide plate disposed in the accommodating space;
        a light source located near the light guide plate and disposed in the accommodating space;
        an optical film configured on the light guide plate and disposed in the accommodating space; and
    a pad located between the optical film and the display panel and disposed in the accommodating space, wherein a first surface of the pad is fixed to and contacts the optical film, a second surface of the pad is slidable relative to the display panel, and the pad is separated from the back plate and is not disposed for fixing the optical film onto the back plate.

2. The display as claimed in claim 1, wherein the second surface of the pad is in contact with the display panel, or a gap is between the second surface of the pad and the display panel.

3. The display as claimed in claim 2, wherein the gap is substantially smaller than about 0.15 mm.

4. The display as claimed in claim 1, wherein the pad is configured on an edge of the optical film.

5. The display as claimed in claim 4, wherein the edge of the optical film corresponds to a non-display region of the display panel.

6. The display as claimed in claim 1, wherein the optical film comprises a flexible base film.

7. The display as claimed in claim 1, wherein the optical film comprises a prism, a diffuser, a polarizer, an enhancement film, or a multi-functional optical film.

8. The display as claimed in claim 1, wherein the pad comprises a single-sided adhesive tape.

9. The display as claimed in claim 1, wherein a material of the pad comprises an organic material.

10. The display as claimed in claim 1, wherein a method of forming the pad comprises printing or coating.

* * * * *